United States Patent [19]
Tysver

[11] Patent Number: 5,224,390
[45] Date of Patent: Jul. 6, 1993

[54] DIRECTION REVERSING ACTUATOR APPARATUS

[75] Inventor: John D. Tysver, Rockford, Ill.

[73] Assignee: Sundstrand Corporation, Rockford, Ill.

[21] Appl. No.: 702,748

[22] Filed: May 20, 1991

Related U.S. Application Data

[63] Continuation-in-part of Ser. No. 380,883, Jul. 17, 1989, abandoned.

[51] Int. Cl.$^5$ .................. F16H 27/02; F16H 21/44
[52] U.S. Cl. ................................. 74/89; 74/96; 74/569; 74/10.29
[58] Field of Search ............ 74/25, 10.2, 20.27, 74/10.29, 70, 89, 96, 526, 577, 569

[56] References Cited

U.S. PATENT DOCUMENTS

| | | | |
|---|---|---|---|
| 296,977 | 4/1884 | Lavigne | 74/96 |
| 792,038 | 6/1905 | Hocke et al. | 74/96 X |
| 978,939 | 12/1910 | Russell et al. | 74/126 X |
| 2,313,221 | 3/1943 | Campbell | 74/70 |
| 2,660,065 | 11/1953 | Williams | 74/70 X |
| 2,836,991 | 6/1958 | Perlis | 74/10.2 X |
| 3,012,447 | 12/1961 | Wallace | 74/526 |
| 3,216,658 | 11/1965 | Greenhow | 235/91 |
| 3,338,224 | 8/1967 | Isley et al. | 74/10.29 X |
| 3,451,287 | 6/1969 | Riviere | 74/483 |
| 3,666,063 | 5/1972 | Schoeman et al. | 192/21 |
| 4,572,027 | 2/1986 | Lusk | 74/812 |
| 4,967,886 | 12/1990 | Tysver et al. | 192/18 A |

FOREIGN PATENT DOCUMENTS

| | | | |
|---|---|---|---|
| 2737020 | 8/1978 | Fed. Rep. of Germany | 74/96 |
| 707995 | 4/1954 | United Kingdom | 74/526 |
| 980677 | 1/1965 | United Kingdom | 74/25 |

*Primary Examiner*—Leslie A. Braun
*Assistant Examiner*—David W. Laub
*Attorney, Agent, or Firm*—Wood, Phillips, VanSanten, Hoffman & Ertel

[57] ABSTRACT

The problem of providing a simplified actuator apparatus (10) for converting unidirectional motion to multidirectional motion is provided by a driven member (14) rotatable about a first axis (18) and a drive member (12) rotatable about a second axis (28) generally parallel to and spaced from the first axis (18). The driven member (14) has first (20) and second (22) radially disposed, diametrically opposed cam followers. The drive member (12) has first (36) and second (38) radially disposed cam actuators. The first cam follower (20) of the driven member (14) is engageable by the first cam actuator (36) of the drive member (12) for driving the driven member in one direction of rotation in response to rotation of the drive member in one direction. The second cam follower (22) of the driven member (14) is engageable by the second cam actuator (38) of the drive member (12) for driving the driven member in an opposite direction of rotation in response to continued rotation of the drive member in the same, one direction.

14 Claims, 4 Drawing Sheets

DIRECTION REVERSING ACTUATOR APPARATUS

CROSS REFERENCE

This application is a continuation-in-part application of Ser. No. 380,883, filed Jul. 17, 1989 entitled "Direction Reversing Actuator Apparatus", now abandoned.

FIELD OF THE INVENTION

This invention generally relates to actuator devices and, particularly, to a direction reversing actuator apparatus such as an apparatus for converting unidirectional motion to multidirectional motion.

BACKGROUND OF THE INVENTION

Actuator devices are used in a wide variety of applications and, in some instances, such devices are necessary to convert one form of motion to another form of motion. For instance, with a gear train rotating in one direction, it might be necessary to create a reversible reaction direction for performing a specific function. In another application, it might be necessary to rotate the gear train in two directions while creating a unidirectional reaction for performing a specific function.

These general operative parameters are particularly prevalent in aircraft and aerospace applications wherein a variety of operative components must be actuated in a particular sequence. For instance, one application might be a power drive unit which must perform sequenced shifting between two separate outlets, such as a pallet output and a door output for loading a cargo bay of an aircraft. A door first must be opened, followed by "opening" (extending) of the pallet. In reverse sequence, the pallet first must be "closed" (retracted), followed by closing of the door. The door and pallet are conventionally driven by gear train means and are held in closed condition by brakes, such as spring biased brakes. In order to effect sequential actuation of such components, problems heretofore have arisen because of the complexity involved and packaging required for effective actuating devices to perform such various sequential actuating programs. Simplicity, weight and size are critical considerations in the aircraft and aerospace industry.

This invention is directed to solving such problems by providing a unique, extremely simple actuating apparatus capable of reversing direction actuation as well as converting unidirectional motion to multidirectional (e.g. reversing) motion.

SUMMARY OF THE INVENTION

An object, therefore, of the invention is to provide a new and improved actuator apparatus of the character described.

In the exemplary embodiment of the invention, generally, a driven member is rotatable about a first axis and has first and second radially disposed follower means. A driven member is rotatable about a second axis generally parallel to the first axis and has first and second radially disposed actuator means. In essence, the follower means of the driven member can be considered as cam followers and the actuator means of the drive member can be considered as cams.

According to the concepts of the invention, the first follower means of the driven member is located in a rotational path of movement so as to be engageable by the first actuator means of the drive member for driving the driven member in one direction of rotation in response to rotation of the drive member in one direction. The second follower means of the driven member is located in a rotational path of travel so as to be engageable by the second actuator means of the drive member for driving the driven member in an opposite direction of rotation in response to continued rotation of the drive member in said one direction.

More particularly, the first and second cam follower means of the driven member are disposed on diametrically opposite sides of the first axis. As disclosed herein, the cam follower means project radially outwardly of an inner hub portion of the driven member. The first and second actuator cam means of the drive member are spaced at different distances from the second axis but on a common side of a diameter through the second axis. The first and second actuator cam means project radially inwardly of an outer frame portion of the drive member surrounding the hub portion of the driven member.

The invention also contemplates the drive member having a third radially disposed actuator cam means for engaging the second cam follower of the driven member to drive the driven member in its opposite direction in response to rotation of the drive member opposite said one direction.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENT

Figure 1:
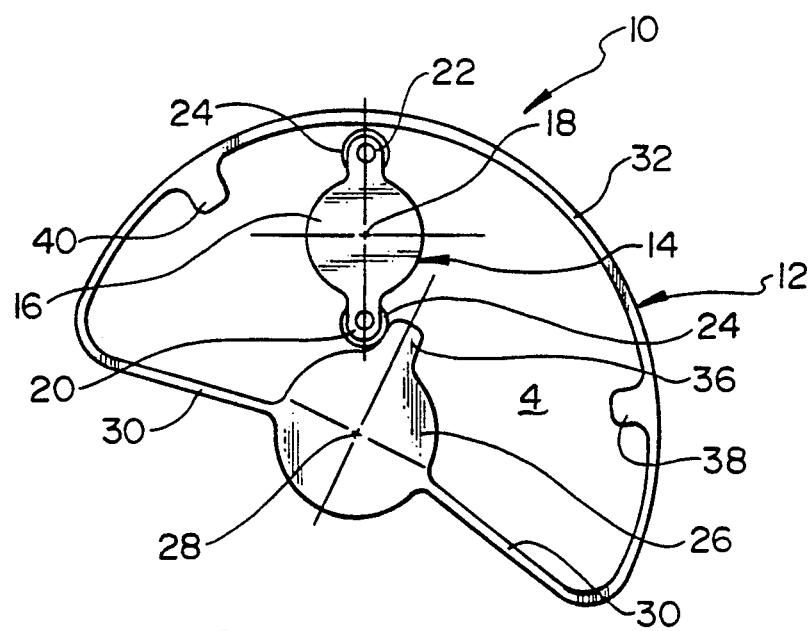
FIGS. 1–3 illustrate a sequence of operation of the actuator apparatus of the invention for converting unidirectional rotating motion of the drive member to multidirectional (reversing) rotating motion of the driven member.

Referring to the drawings in greater detail, and first to FIG. 1, the invention is carried out in the form of an actuator apparatus, generally designated 10, which includes a drive member, generally designated 12, and a driven member, generally designated 14. It should be understood that whatever components the actuator apparatus is to be used with, such as the gear trains of an aircraft door/ pallet system, are not shown in the drawings because the unique actuator apparatus shown has such a wide range of applications.

More particularly, driven member 14 includes a hub portion 16 rotatable about a first axis 18 which may be the axis of a shaft for performing specific functions, such as in a gear train. First and second radially disposed follower means 20 and 22 project radially outwardly of hub portion 16. The follower means effectively form first and second cam followers and may include rollers 24 for engaging the cam actuator means of the drive member (described below) to provide for ease of operation.

Drive member 12 also includes a hub portion 26 rotatable about a second axis 28 generally parallel to first axis 18 of driven member 14. Axis 28 may be the axis of a shaft driven by a gear train. A sort of "halfmoon" frame is formed integral with hub portion 26 and includes a pair of radially projecting leg portions 30 joined by an arcuate segment 32 to define an open area 34 surrounded by leg portions 30 and arcuate segment 32. The operative follower means and actuator means interacting between drive member 12 and driven member 14 are located within this open area.

Specifically, drive member 12 has first, second and third actuator means in the form of a first cam actuator 36 projecting radially outwardly from hub portion 26, and second and third cam actuators 38 and 40, respectively, projecting radially inwardly from arcuate segment 32. Looking at FIG. 1, it can be seen that cam actuator 36 of drive member 12 and cam follower 20 of driven member 14 are located in intersecting rotational paths of travel defined by their respective axes 28 and 18, respectively. It also can be seen that cam actuators 38 and 40 of drive member 12 are angularly spaced relative to axis 28, but the cam actuators are in a common rotational path of movement which can intersect the rotational path of movement of cam follower 22 of driven member 14. Technically, cam followers 20 and 22 of driven member 14 are disposed on diametrically opposite sides of axis 18 in a concentric rotational path of travel. Cam actuator 36 and cam actuators 38,40 of drive member 12 are located in radially spaced paths of travel to enable the actuators to engage the differently located cam followers 20,22.

Figure 2:
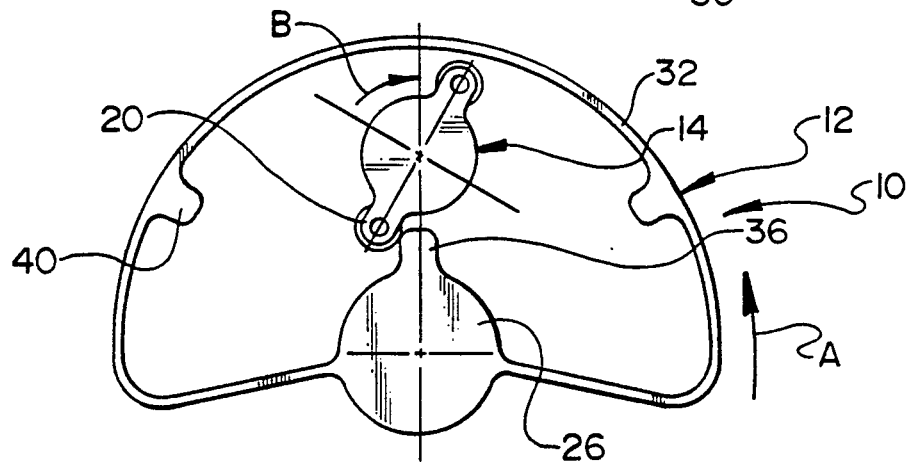
Figure 3:
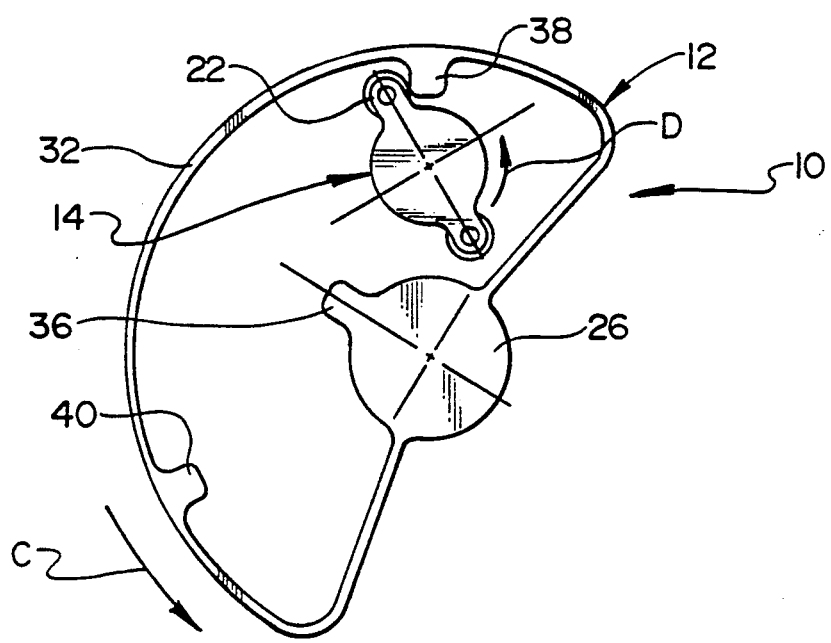

FIGS. 1–3 illustrate a sequence of operation of actuator apparatus 10 wherein unidirectional rotational motion of drive member 12 in a counterclockwise direction (as viewed in the drawings) is effective to cause multidirectional motion of driven member 14, i.e. opposite rotational motion. More particularly, FIG. 1 shows drive member 12 and driven member 14 in what can be called a neutral position, i.e. with cam followers 20,22 vertically oriented as shown. As drive member 12 is rotated in a counterclockwise direction as indicated by arrow "A" in FIG. 2, actuator cam 36 rotates into engagement with cam follower 20 of driven member 14 to rotate the driven member in a clockwise direction as indicated by arrow "B". In whatever appropriate system actuator apparatus 10 is being used, this can effect a specific function.

As shown in FIG. 3, continued rotation of drive member 12 in the counterclockwise direction, as indicated by arrow "C", will cause actuator cam 38 to rotate into engagement with cam follower 22 of drive member 14 to cause the drive member to reverse direction, i.e. rotate in a counterclockwise direction as indicated by arrow "D". Therefore, it can be seen that unidirectional motion (or counterclockwise rotation) of drive member 12 is effective to convert that unidirectional motion into reversing or multidirectional motion of driven member 14.

Figure 4:
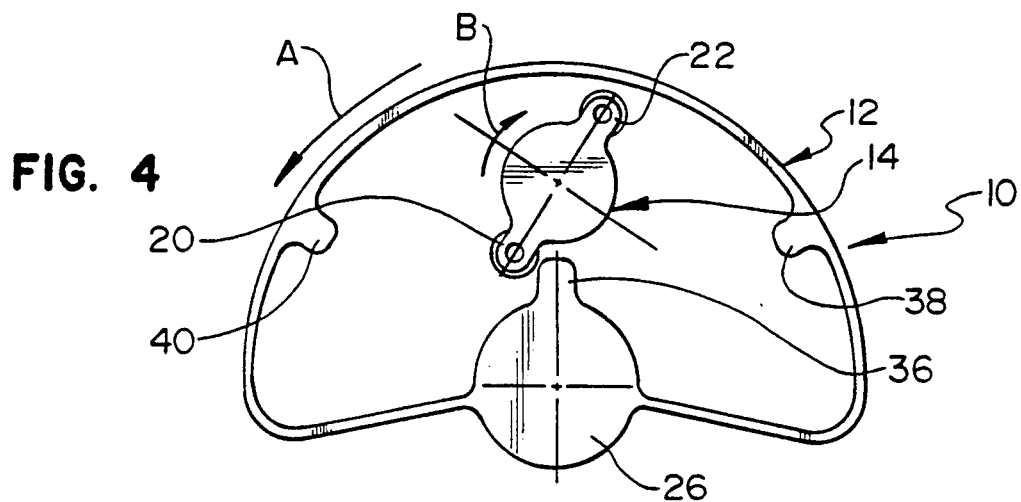
FIGS. 4 and 5 illustrate a sequence of operation of the actuator apparatus wherein unidirectional motion of the driven member is effected by either of opposite rotational motions of the drive member.
Figure 5:
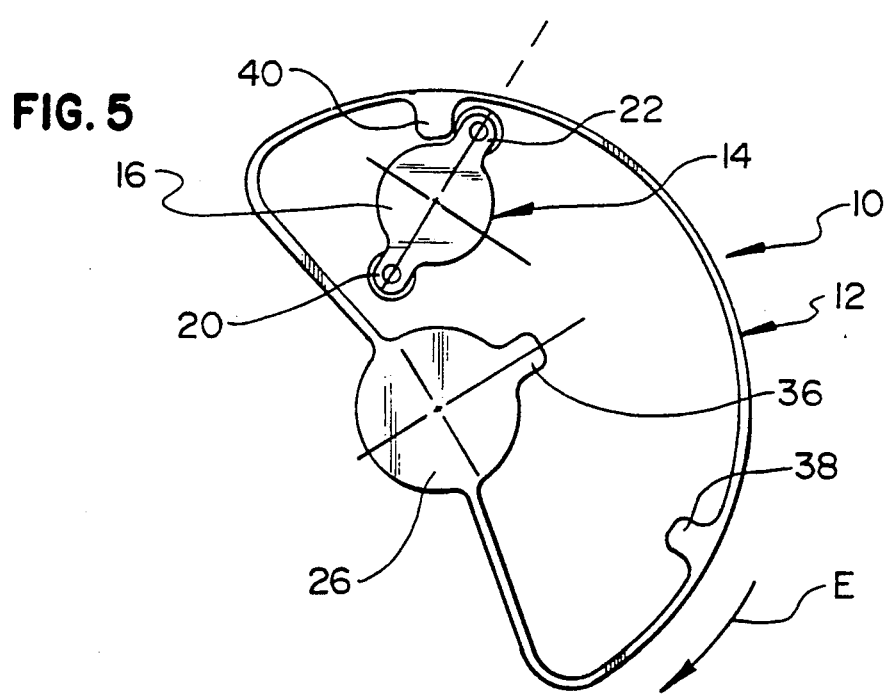

FIGS. 4 and 5 show a second sequence of operation which can be effected by the same components, i.e. drive member 12 and driven member 14, in response to reversing motion of drive member 12. In essence, these depictions show that reversing directional motion of the drive member as input rotation to the apparatus will effect a unidirectional function of driven member 14. More particularly, FIG. 4 is identical to FIG. 2 to again illustrate that counterclockwise rotation of drive member 12 in the direction of arrow "A" will cause cam actuator 36 to engage cam follower 20 of drive member 14 to effect clockwise rotation of the driven member in the direction of arrow "B". Again, this can effect a given function for whatever appropriate system the actuator apparatus is being used. However, FIG. 5 shows that drive member 12 now has been reversed to rotate in a clockwise direction, as indicated by arrow "E", so that third cam actuator 40 now comes into engagement with cam follower 22 of driven member 14 to cause the driven member to maintain its clockwise position. As seen, this reversing direction of drive member 12 is shown to maintain the driven member in the same condition as shown in FIG. 4. In other words, there may be an instance in an application wherein the function effected by the driven member is to be maintained, whereas rotation of the drive member in opposite directions can itself effect two different specific functions in a system while the function effected by the driven member is maintained.

As stated above, the actuator apparatus of the invention can be used in a wide variety of applications in aircraft and aerospace fields, and one such application may be in a loading system for a cargo bay of an aircraft, involving an actuation sequence of the door and pallet at the entrance to the cargo bay. As stated above, the door would be opened first, followed by extension of the pallet, but the pallet would have to be retracted before the door is closed. Heretofore, such an actuation system involved extremely complicated actuation devices.

FIGS. 6–11 show how the actuator apparatus of this invention could be used with the respective brakes for the door and the pallet. The brakes must be released in a particular sequence before any of the mechanisms for moving the door and the pallet can be made operational.

Figure 6:
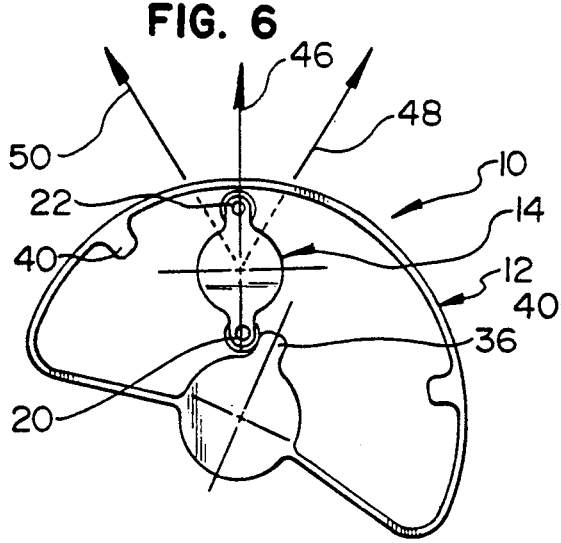
FIGS. 6–11 illustrate a sequence of operation of the actuator apparatus as might be applied to operation of a door/pallet system for loading a cargo bay of an aircraft.

Specifically, FIG. 6 again shows the actuation apparatus 10 in a neutral condition as described in relation to FIG. 1, with driven member 14 vertically oriented as viewed in the drawings. Position arrows 46, 48 and 50 are shown in FIG. 6 simply to depict positions of driven member 14 corresponding to various functional characteristics of the door and the pallet brakes. Arrow 46 shows a neutral position wherein both the door and pallet brakes are applied, with the door and pallet brakes shown schematically in FIG. 6 (such brakes normally would be spring biased to braking condition). Arrow 48 depicts a position where the door brake is released, and arrow 50 depicts a position wherein the pallet brake is released.

These door and pallet systems are commonly operated through gear trains which produce a bias, as through a spring on the driven member 14. Arrow 46 in FIG. 6 shows a neutral position wherein both the door and pallet brakes are applied. Actuation of the door and pallet brakes results in the application of a spring force on the driven member 14 to place the driven member 14 in the neutral position therefor. (See arrow 46 in FIG. 6).

The inventive structure would operate without this neutralizing spring force, however, the sequence of movement of the driven member would be slightly different than that shown in the drawings.

Figure 7:
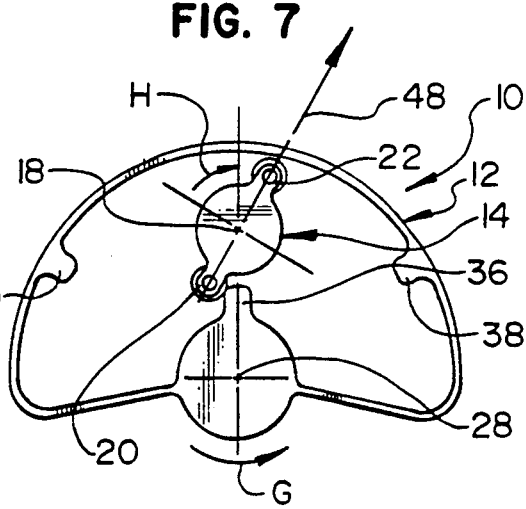

FIG. 7 shows drive member 12 having been rotated in a counterclockwise direction, as indicated by arrow "G", which rotates driven member 14 clockwise in the direction of arrow "H". This motion was described in relation to FIG. 4. It can be seen that the driven member now is in the "door brake released position" as described above in relation to arrow "48" in FIG. 6. Counterclockwise rotation of drive member 12 is also linked, by means of an appropriate mechanism not shown, to output rotation which will open the door while the door brake is held released by driven member 14. Of course, again, it should be understood that the invention does not contemplate the various mechanisms for the brakes and drive trains, which are not shown. The specific functions performed are door brake release by clockwise rotation of driven member 14 about its axis 18, and door open rotation associated with counterclockwise rotation of drive member 12 about its axis 28.

Figure 8:
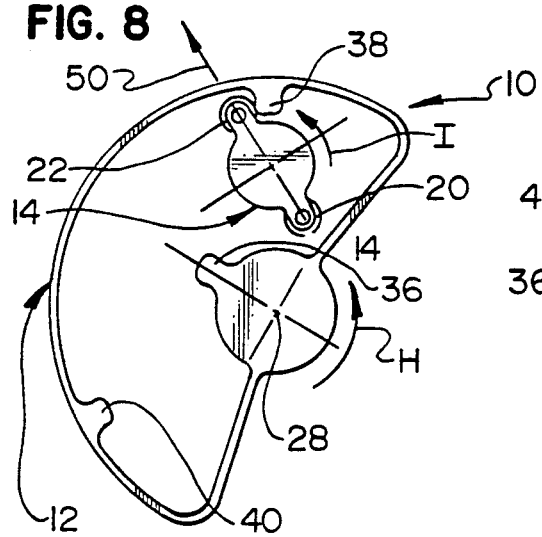

Continuing on, drive member 12 can continue to be rotated counterclockwise in the direction of arrow "H" in FIG. 8, by any appropriate shaft on axis 28, such that the actuator apparatus functions as described in relation to FIG. 8. In other words, actuator cam 38 now engages cam follower 22 to cause driven member 14 to reverse direction and rotate in a counterclockwise motion as indicated by arrow "I". It can be seen that the driven member now has been moved to the "pallet brake released" position as indicated by arrow 50. In this position, with the pallet brake released against its spring load, some other appropriate mechanism linked to counterclockwise rotation of drive member 12 moves the pallet to its open condition, while the door still is being held open by a conventional static brake.

Figure 9:
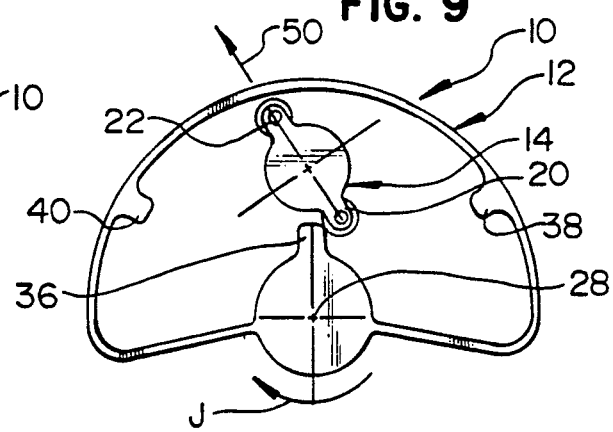

FIG. 9 shows that drive member 12 now has been reversed to rotate in a clockwise direction as indicated by arrow "J". However, this does not effect driven member 14 for the same reasons as described in relation to FIGS. 4 and 5 (simply in an opposite directional relationship), whereby the driven member remains in its "pallet brake released" position as indicated by arrow 50. However, since drive member 12 can be connected to a shaft on axis 28, this reversing direction of the drive member, itself, can be used to effect a specific function. In the scheme used as an example herein, this function could be used to actuate a pallet closing mechanism because driven member 14 still is maintained in its pallet brake released condition.

Figure 10:
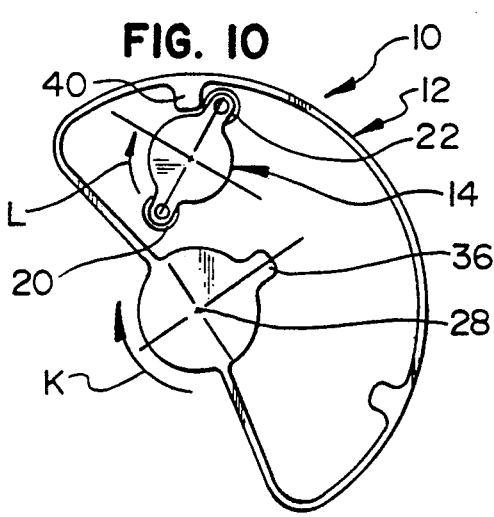
Figure 11:
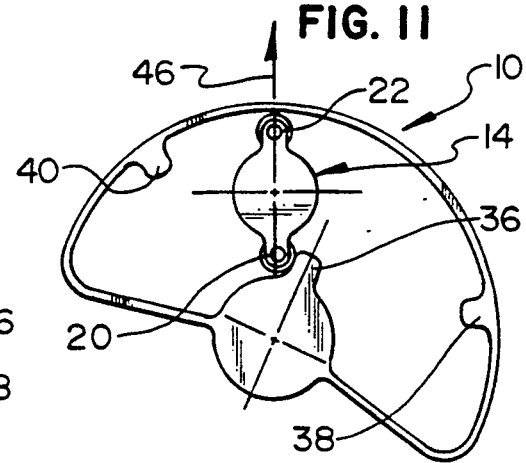

As drive member 12 continues to rotate in clockwise direction as indicated by arrow "K" in FIG. 10, cam actuator 40 now is rotated into engagement with cam follower 22 of driven member 14 to cause the driven member to rotate in a clockwise direction as indicated by arrow "L". This takes the pallet brake out of its released condition whereupon the pallet again is braked in position within the cargo bay while the door brake is released. The continued clockwise rotation of the drive member about axis 28 again is used to actuate a separate mechanism to close the door. By returning actuator apparatus 10 back to its original condition as shown in FIG. 11 (corresponding to FIG. 6), driven member 14 now is normally biased back to its neutral position by the pallet/brake system wherein both the door and pallet brakes again are applied as indicated by arrow 46.

From the foregoing, it can be understood that the actuator device has utility in a wide range of applications, the illustrations of FIGS. 6-11 being representative of utilizing the actuator apparatus in conjunction with the brakes of an aircraft door and pallet system, keeping in mind that other separate mechanisms (not shown) are necessary to effect actual opening and closing of the door and pallet. In addition, the axis 28 of drive member 12, as it might be connected to a shaft in an appropriate gear train, itself could be used to effect various actuating functions, such as the initiation of door and pallet opening and closing mechanisms.

Figure 12:
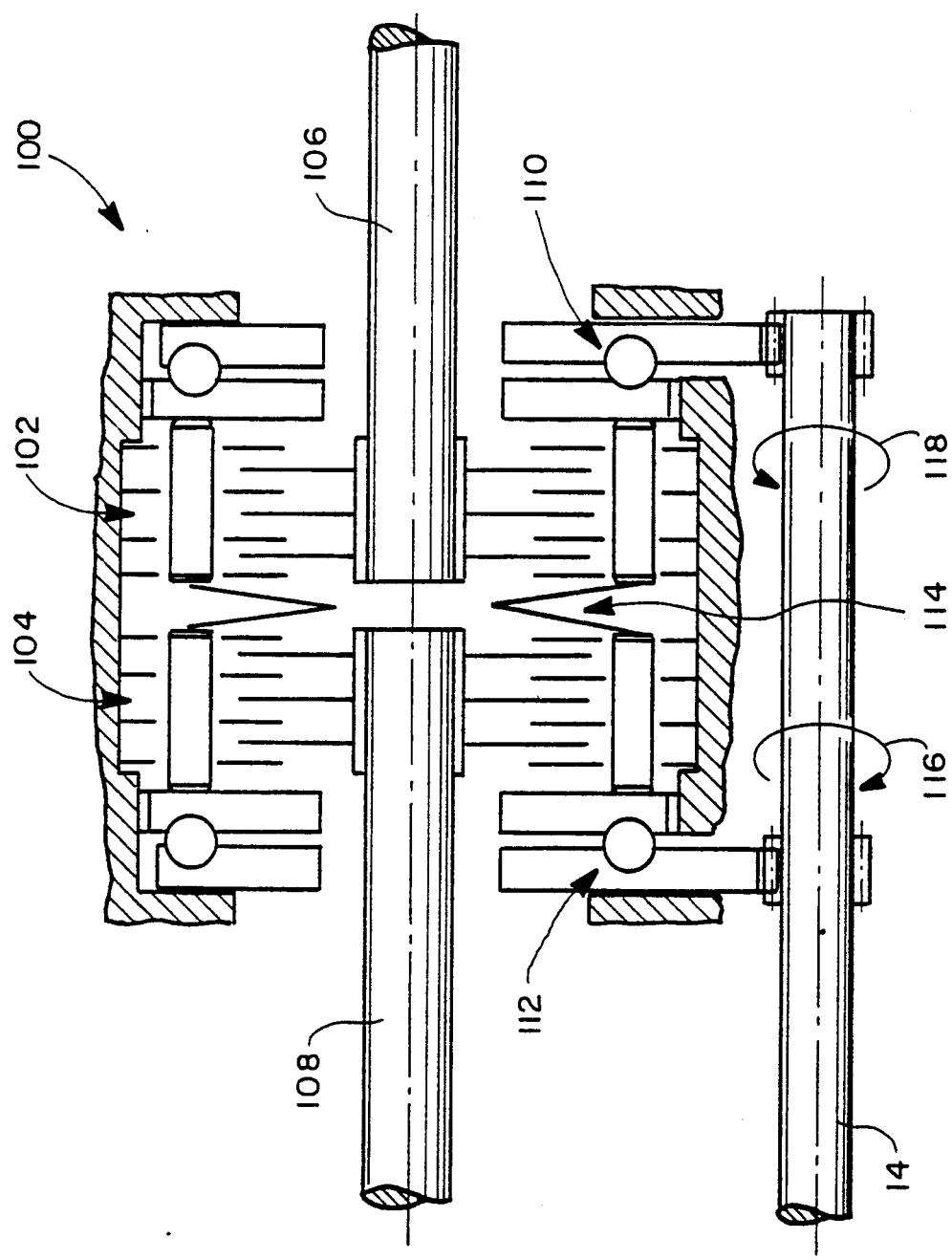
FIG. 12 is a schematic representation of a conventional door/pallet system with which the present invention can be employed.

An exemplary prior art pallet/brake system is shown at 100 in FIG. 12. The system 100 has a pallet brake 102 and a door brake 104 associated with pallet and door drive trains 106, 108, respectively.

Release ball/ramp assemblies are provided for the pallet brake at 110 and for the door brake at 112. A spring element at 114 exerts an axial force on the pallet and door brakes 102, 104. This axial spring force is converted by the ball ramps 110, 112 into a torque which biases the driven member 14 to a neutral position. (See FIG. 11).

Clockwise rotation of the driven member 14, as indicated by arrow 116, releases the door brake 104. Counterclockwise rotation of the driven member, as indicated by arrow 118, releases the pallet brake 102.

A typical prior art brake system, which is spring biased into an applied position, is shown in U.S. Pat. No. 4,967,886, incorporated herein by reference. In that patent, the springs 24 push through pin 48 of the ball ramp 42. A driven member corresponding to the driven member 14 in the present case, can be coupled to the ball ramp 42, and resultingly would be spring biased to a neutral position.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

I claim:

1. An actuator apparatus for converting unidirectional motion to multidirectional motion, said actuator apparatus comprising:
   a driven member rotatable about a first axis and having first and second radially disposed follower means;
   a drive member rotatable about a second axis generally parallel to and spaced from said first axis and having first and second radially disposed actuator means,
   at least one said first and second radially disposed actuator means projecting radially inwardly towards and spaced from said second axis;
   the first follower means of the driven member being located in a rotational path of movement so as to be engageable by the first actuator means of the drive member for driving the driven member in one direction of rotation in response to rotation of the drive member in one direction; and
   the second follower means of the driven member being located in a rotational path of movement so as to be engageable by the second actuator means of the drive member for driving the driven member in an opposite direction of rotation in response to continued rotation of the drive member in said one direction.

2. The apparatus of claim 1 wherein said first and second follower means of the driven member are disposed on diametrically opposite sides of said first axis.

3. The apparatus of claim 2 wherein said first and second actuator means of the drive member are spaced at different distances from said second axis.

4. The apparatus of claim 3 wherein said first and second actuator means of the drive member are located on a common side of a diameter through said second axis.

5. The apparatus of claim 1 wherein said first and second follower means of the driven member project radially outwardly of an inner hub portion of the driven member.

6. An actuator apparatus for converting unidirectional motion to multidirectional motion, said actuator apparatus comprising:

a driven member rotatable about a first axis and having first and second radially disposed follower means;

a drive member rotatable about a second axis generally parallel to and spaced from said first axis and having first and second radially disposed actuator means;

the first follower means of the driven member being located in a rotational path of movement so as to be engageable by the first actuator means of the drive member for driving the driven member in one direction of rotation in response to rotation of the drive member in one direction; and the second follower means of the driven member being located in a rotational path of movement so as to be engageable by the second actuator means of the drive member for driving the driven member in an opposite direction of rotation in response to continued rotation of the drive member in said one direction, wherein said first and second follower means of the driven member project radially outwardly of an inner hub portion of the driven member, wherein said drive member has a hub portion, said first actuator means of the drive member projects radially outwardly of the drive member hub portion and the second actuator means of the drive member projects radially inwardly of an outer frame portion of the drive member surrounding the hub portion of the driven member.

7. An actuator apparatus for converting unidirectional motion to multidirectional motion, said apparatus comprising:

a driven member rotatable about a first axis and having first and second radially disposed follower means;

a drive member rotatable about a second axis generally parallel to and spaced from said first axis and having first and second radially disposed actuator means;

the first follower means of the driven member being located in a rotational path of movement so as to be engageable by the first actuator means of the drive member for driving the driven member in one direction of rotation in response to rotation of the drive member in one direction; and the second follower means of the driven member being located in a rotational path of movement so as to be engageable by the second actuator means of the drive member for driving the driven member in an opposite direction of rotation in response to continued rotation of the drive member in said one direction, wherein said drive member includes a third radially disposed actuator means for engaging the second follower means of the driven member to drive the driven member in said one direction in response to rotation of the drive member opposite its said one direction.

8. An actuator apparatus for converting unidirectional motion to multidirectional motion, said apparatus comprising:

a driven member rotatable about a first axis and having first and second follower means disposed on diametrically opposite sides of said first axis and projecting radially outwardly from an inner hub portion of the driven member;

a drive member rotatable about a second axis generally parallel to and spaced from said first axis and having first and second radially disposed actuator means, at least one said first and second radially disposed actuator means projecting radially inwardly towards and spaced from said second axis;

the first follower means of the driven member being located in a rotational path of movement so as to be engageable by the first actuator means of the drive member for driving the driven member in one direction of rotation in response to rotation of the drive member in one direction; and the second follower means of the driven member being located in a rotational path of movement so as to be engageable by the second actuator means of the drive member for driving the driven member in an opposite direction of rotation in response to continued rotation of the drive member in said one direction.

9. The apparatus of claim 8 wherein said first and second actuator means of the drive member are spaced at different distances from said second axis.

10. The apparatus of claim 9 wherein said first and second actuator means of the drive member are located on a common side of a diameter through said second axis.

11. An actuator apparatus for converting unidirectional motion to multidirectional motion, said apparatus comprising:

a driven member rotatable about a first axis and having first and second follower means disposed on diametrically opposite sides of said first axis and projecting radially outwardly from an inner hub portion of the driven member;

a drive member rotatable about a second axis generally parallel to and spaced from said first axis and having first and second radially disposed actuator means;

the first follower means of the driven member being located in a rotational path of movement so as to be engageable by the first actuator means of the drive member for driving the driven member in one direction of rotation in response to rotation of the drive member in one direction; and the second follower means of the driven member being located in a rotational path of movement so as to be engageable by the second actuator means of the drive member for driving the driven member in an opposite direction of rotation in response to continued rotation of the drive member in said one direction, wherein said drive member has a hub portion, said first actuator means of the drive member projects outwardly of the drive member hub portion and the second actuator means of the drive member projects radially inwardly of an outer frame portion of the drive member surrounding the hub portion of the driven member.

12. An actuator apparatus for converting unidirectional motion to multidirectional motion, said apparatus comprising:
- a driven member rotatable about a first axis and having first and second follower means disposed on diametrically opposite sides of said first axis and projecting radially outwardly from an inner hub portion of the driven member;
- a drive member rotatable about a second axis generally parallel to and spaced from said first axis and having first and second radially disposed actuator means;
- the first follower means of the driven member being located in a rotational path of movement so as to be engageable by the first actuator means of the drive member for driving the driven member in one direction of rotation in response to rotation of the drive member in one direction; and
- the second follower means of the driven member being located in a rotational path of movement so as to be engageable by the second actuator means of the drive member for driving the driven member in an opposite direction of rotation in response to continued rotation of the drive member in said one direction,
- wherein said drive member includes a third radially disposed actuator means for engaging the second follower means of the driven member to drive the driven member in said one direction in response to rotation of the drive member opposite its said one direction.

13. An actuator apparatus for converting unidirectional motion to multidirectional motion, comprising:
- a driven member including an inner hub portion rotatable about a first axis and having first and second cam followers projecting radially outwardly from the inner hub portion on diametrically opposite sides thereof;
- a drive member including a hub portion rotatable about a second axis generally parallel to and spaced from said first axis, with an outer frame portion surrounding the driven member, the drive member having a first cam actuator projecting radially outwardly from its hub portion and second and third cam actuators projecting radially inwardly from said frame portion;
- the first cam follower of the driven member being located in a rotational path of movement so as to be engageable by the first cam actuator on the hub portion of the drive member for driving the driven member in one direction of rotation in response to rotation of the drive member in one direction;
- the second cam follower of the driven member being located in a rotational path of movement so as to be engageable by the second cam actuator projecting inwardly from the frame portion of the drive member for driving the driven member in an opposite direction of rotation in response to continued rotation of the drive member in said one direction; and
- the third cam actuator of the drive member being located for engaging the second follower means of the driven member to drive the driven member in said one direction in response to rotation of the drive member opposite its said one direction.

14. An actuator apparatus, comprising:
- a driven member rotatable about a first axis and having first and second radially disposed follower means;
- a drive member rotatable about a second axis generally parallel to and spaced from said first axis and having first and second radially disposed actuator means,
- at least one said first and second radially disposed actuator means projecting radially inwardly towards and spaced from said second axis;
- the first follower means of the driven member being located in a rotational path of movement so as to be engageable by the first actuator means of the drive member for driving the driven member in one direction of rotation in response to rotation of the drive member in one direction; and
- the second follower means of the driven member being located in a rotational path of movement so as to be engageable by the second actuator means of the drive member for driving the driven member in said one direction in response to rotation of the drive member in a direction opposite its said one direction.

* * * * *